G. F. JEFFERSON.
BREAD PAN.
APPLICATION FILED SEPT. 29, 1911.

1,015,892.

Patented Jan. 30, 1912.

WITNESSES:
May Montgomery
J. W. Yeagley

INVENTOR
George F. Jefferson
BY
Hardway & Cathey
ATTORNEYS.

UNITED STATES PATENT OFFICE.

GEORGE F. JEFFERSON, OF HOUSTON, TEXAS.

BREAD-PAN.

1,015,892.  Specification of Letters Patent.  Patented Jan. 30, 1912.

Application filed September 29, 1911. Serial No. 651,911.

*To all whom it may concern:*

Be it known that I, GEORGE F. JEFFERSON, a citizen of the United States, residing at Houston, in the county of Harris and State of Texas, have invented certain new and useful Improvements in Bread-Pans, of which the following is a specification.

My invention relates to new and useful improvements in bread pans.

The object of the invention is to provide a pan of the character described having a lid to which is attached a numer of aluminum blades. Between these blades the dough rises in form of slices adhering to the lower crust, which is not penetrated by said blades. These blades distribute heat and bake the loaf uniformly, thereby preventing sogginess and producing a more palatable and healthful bread. The loaf when it comes from a pan of the character described is also sliced, and ready for use, the slices being held together by the bottom crust of the loaf.

With the above and other objects in view, the invention has particular relation to certain novel features of construction, use and arrangement of parts, an example of which is given in this specification, and illustrated in the accompanying drawings, wherein:—

Figure 1:
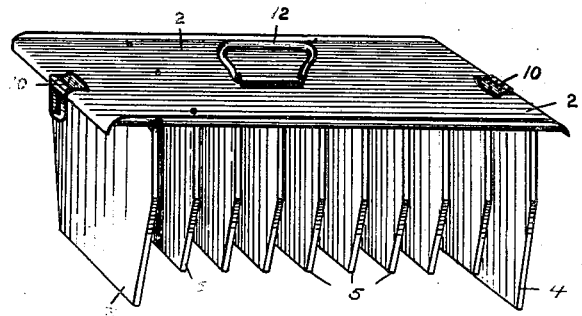
Figure 2:
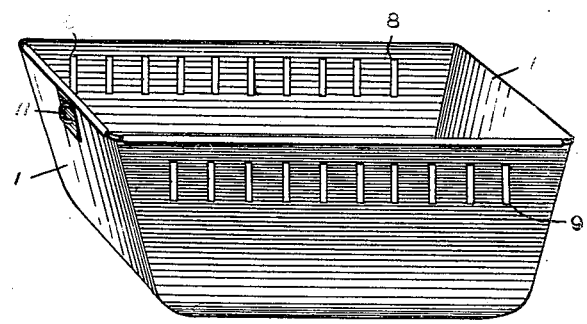

Figure 1 is a perspective view of the pan cover with the blades secured thereto. Fig. 2 is a perspective view of the pan, and Fig. 3 is a plan view of one of the blades.

Figure 3:
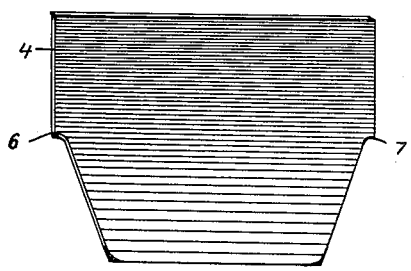

Referring now more particularly to the drawings, wherein like numerals of reference designate similar parts in each of the figures the numeral 1 refers to the pan, which, in cross section is shaped substantially similar to the shape of the blade shown in Fig. 3, the sides diverging slightly outwardly so that the loaf may be readily withdrawn therefrom. A covering 2 is provided for this pan which is a parallelogram in shape and whose ends are crimped or curved downwardly so as to fit closely over the ends of the pan. Secured to this covering and depending therefrom is a plurality of blades arranged at a uniform distance apart and the end blades being arranged each an equal distance from the end of the covering. These end blades are designated by the numerals 3 and 4 and extend entirely to the bottom of the bread pan and rest upon the extreme ends of said bottom and the intermediate blades 5 are preferably about a half inch shorter than the end blades and consequently do not reach to the bottom of the pan. The blades are so shaped as to fit closely against the sides of the pan and said blades are provided with laterally extending shoulders, 6 and 7, one on each side which fit into corresponding vertically extending slots 8 and 9, and which rest upon the lower end of said slots. The blades are held firmly in place by means of said slots and their distance apart and the consequent thickness of the slices of the loaf are thus preserved uniform.

Each end of the covering is provided with a hasp, hinged thereto which is provided to engage over staples 11, secured upon each end of the pan, and the lid is thus held against being forced upwardly by the rising of the loaf as it bakes. A handle 12 is secured to the covering, by means of which said covering may be removed.

The dough is first placed in the pan and the lid with its depending blades is then secured in place, the end blades 3 and 4 resting against each end of the loaf and the intermediate blades projecting into the dough. The pan is later placed in an oven and as the loaf bakes it rises between the blades, and is limited in length by the end blades and is formed into slices, by means of the intermediate blades 5, the said slices being secured together by the bottom crust of the loaf. The slices correspond in thickness to the distance between the blades and this distance is usually about half an inch but may be varied as desired. When the loaf is thoroughly baked the hasps 10 may be loosened and the covering removed and the blades and loaf are withdrawn with it from the pan.

After removing the pan from the oven the blades (which are preferably made of aluminum) retain heat for a long time, thereby affording means for regulating different degrees of crispness of the bread, so it can be changed directly into either toast, rusk, wafers, crackers or zwieback, according to the length of time the loaf remains between the blades after removal from the oven.

The blades may be made integral with the covering or may be riveted thereto, or may be secured thereto by means of a dove-tail carried by the upper edge of the blade which fits into a corresponding transverse slot in the covering, all of which methods of securing the blades are shown in Fig. 1.

A bread pan constructed as described in this specification and illustrated in the drawings accompanying the same and made a part thereof will be found to be easily made and used and will produce a loaf of bread evenly cooked throughout and sliced and ready for use when withdrawn from the pan.

What I claim is:—

1. A device of the character described including a suitable pan, a detachable covering therefor, a plurality of blades secured to the covering, arranged at a uniform distance apart and projecting within the pan, the end blades extending entirely to the bottom of the pan and the intermediate blades falling short of said bottom and means for securing the covering on the pan.

2. A device of the character described including a suitable pan having a row of vertically extending slots arranged in each side thereof, a covering for said pan, a plurality of blades secured to the covering and arranged at a uniform distance apart and projecting into the pan, a shoulder on each side of each blade, the said shoulders projecting into the corresponding slots on the sides of the pan and means for securing the covering on the pan.

3. A device of the character described including a suitable pan having a row of vertically extending slots in each side thereof, a covering for said pan, a means for securing the covering on the pan, a plurality of blades secured to the covering and arranged at a uniform distance apart, projecting into the pan and extending entirely across the same, the end blades extending entirely to the bottom of the pan and the intermediate blades falling short of said bottom, a shoulder on each side of each blade, the said shoulders projecting into the corresponding slots on the sides of the pan, and a suitable handle for removing said covering and blades from the pan.

4. A device of the character described including a suitable pan having a row of vertically extending slots in each side thereof, a covering for said pan, means carried by each end of the pan and each end of said covering for securing the covering on the pan, a plurality of blades secured to the covering and arranged a uniform distance apart, projecting into the pan and extending entirely across the same, the end blades extending entirely to the bottom of the pan and the intermediate blades falling short of said bottom, a shoulder on each side of each blade, the said shoulders projecting into the corresponding slots on the sides of the pan, and a suitable handle for removing said covering and blades from the pan.

In testimony whereof I have signed my name to this specification in the presence of two subscribing witnesses.

GEORGE F. JEFFERSON.

Witnesses:
E. L. CATHEY,
MAY MONTGOMERY.